(12) United States Patent (10) Patent No.: US 9,330,833 B2
Hu et al. (45) Date of Patent: May 3, 2016

(54) POWER SUPPLY WITH LOW ELECTRO-MAGNETIC INTERFERENCE AND INDUCTOR FOR POWER SUPPLY WITH LOW ELECTRO-MAGNETIC INTERFERENCE

(71) Applicant: Cree, Inc., Durham, NC (US)

(72) Inventors: Yuequan Hu, Morrisville, NC (US); Qingcong Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 541 days.

(21) Appl. No.: 13/761,601

(22) Filed: Feb. 7, 2013

(65) Prior Publication Data

US 2014/0218987 A1 Aug. 7, 2014

(51) Int. Cl.
*H01F 27/32* (2006.01)
*H02M 1/42* (2007.01)

(52) U.S. Cl.
CPC ........... *H01F 27/323* (2013.01); *H02M 1/4225* (2013.01); *Y02B 70/126* (2013.01)

(58) Field of Classification Search
CPC ...... H01F 27/24; H01F 27/28; H01F 27/2823
USPC .................. 336/212, 178, 221; 323/282–285
See application file for complete search history.

(56) References Cited

U.S. PATENT DOCUMENTS

2009/0322293 A1* 12/2009 Kapels .................. H02M 3/155
323/282

OTHER PUBLICATIONS

Zdanowski et al., The Role of the Parasitic Capacitance of the Inductor in Boost Converters with Normally on SiC JFETs, Jun. 2-5 2012, Power Electronics and Motion Control Conference (IPEMC), 2012 7th International (vol. 3 ), pp. 1842-1847.*

* cited by examiner

*Primary Examiner* — Matthew Nguyen
*Assistant Examiner* — Kyle J Moody
(74) *Attorney, Agent, or Firm* — Myers Bigel & Sibley, P.A.

(57) ABSTRACT

A power supply circuit includes an input configured to receive an input voltage, an output configured to supply an output voltage, at least one inductor, at least one diode, and at least one switch. The inductor may have a parasitic capacitance less than about 100 pF. Related inductors are also disclosed.

15 Claims, 11 Drawing Sheets

POWER SUPPLY WITH LOW ELECTRO-MAGNETIC INTERFERENCE AND INDUCTOR FOR POWER SUPPLY WITH LOW ELECTRO-MAGNETIC INTERFERENCE

FIELD

The present disclosure relates to power supplies, and more particularly, to power supplies for driving solid state lighting apparatus.

BACKGROUND

A power supply provides a desired current and/or voltage to a load. For example, referring to FIG. 1, a power supply 10 receives input power from an AC power source 12 in the form of an input voltage $v_{in}$ and an input current $i_{in}$ and converts the input voltage to a desired output voltage $V_{out}$. The output power is supplied to a load 14 with a current $I_{load}$. Accordingly, the function of the power supply 10 is to take the input from the AC source and convert it to a DC or AC current/voltage for the load 14.

The load 14 may, for example, operate from a DC or AC input voltage. An example of a load that may be advantageously operated using a DC input voltage is a solid state light emitting apparatus that includes one or more solid state light emitting diodes (LEDs). Many different types of loads can be powered by a DC input voltage, such as electronic circuits, battery chargers, etc. Other loads, such as electric motors, are typically driven by AC input voltages having suitable amplitudes and frequencies.

FIG. 2 shows a simplified circuit diagram of a power supply 10 that includes an electromagnetic interference (EMI) reducing filter 20 and a bridge rectifier 22 followed by a bulk capacitor $C_B$. The bridge rectifier 22 provides a fully rectified signal to the bulk capacitor $C_B$. A DC voltage is obtained across the bulk capacitor $C_B$, which is then used to power the load 14. Because of the DC voltage across the bulk capacitor $C_B$, the load 14 may draw current from the source only at the peak of the line voltage $v_{in}$ when the line voltage $v_{in}$ is higher than the DC voltage across the bulk capacitor $C_B$.

FIG. 3 is a graph of the input (line) voltage $v_{in}$ and the input current $i_{in}$ for the power supply 10 shown in FIG. 2. As shown in FIG. 3, the input current is pulsating, which may result in rich harmonic contents in the power supply and cause the circuit to have a poor power factor (PF). Power factor is the ratio of the real power flowing to the load to the apparent power in the circuit. A load with a low power factor draws more current than a load with a high power factor for the same amount of useful power transferred. These higher currents increase the energy lost in the distribution system, reducing the efficiency of the power supply.

One way to address this problem is to employ a so called active power-factor correction (PFC) circuit, an example of which is shown in FIG. 4. Referring to FIG. 4, a line voltage $v_{in}$ is filtered by an EMI filter 20 and rectified by a bridge rectifier 22. The filtered, rectified signal is then provided to a boost power supply 30.

The boost power supply 30 with active PFC includes a boost inductor $L_{PFC}$, a diode $D_5$, a bulk capacitor $C_B$ and a switch $Q_1$.

The switch $Q_1$ controls the flow of current through the PFC inductor $L_{PFC}$, and is itself controlled by a controller 32. When the switch $Q_1$ is turned ON, current through the PFC inductor $L_{PFC}$ increases rapidly, causing magnetic energy to be stored in the PFC inductor $L_{PFC}$. In particular, when the switch $Q_1$ is turned on, the PFC inductor current $i_{LPFC}$ ramps up at a rate of $V_{REC}/L_{PFC}$, where $V_{REC}$ is the rectified voltage of the line voltage $v_{in}$.

When the switch $Q_1$ is turned OFF, energy stored in the PFC inductor $L_{PFC}$ is output through the diode $D_5$ in the form of current that charges the bulk capacitor $C_B$. In particular, when switch $Q_1$ is turned off, the voltage across the switch $Q_1$ increases to a level higher than output voltage $V_B$ on the bulk capacitor $C_B$, so that the diode $D_5$ conducts. The inductor current $i_{LPFC}$ decreases at a rate of $(V_O-V_{REC})/L_{FPC}$.

The bulk capacitor $C_B$ provides an output current $I_{LED}$ to the LED load 14. The controller 32 monitors the current flowing in the load based on a voltage through a sense resistor $R_S$ and controls the state of the switch $Q_1$ to achieve a desired power factor.

FIG. 5 is a graph of the input (line) voltage $v_{in}$ and the input current $i_{in}$ for the power supply 30 shown in FIG. 4. As shown in FIG. 5, the line current $i_{in}$ is controlled to follow the shape of the line voltage, which may result in a higher power factor and/or reduced harmonic current contents in the power supply.

In general, there are three control modes for PFC circuits. The first is the discontinuous-conduction mode (DCM); the second is the continuous-conduction mode (CCM); and the third is the critical/boundary CCM/DCM mode. In DCM, during each switching cycle, the inductor current $i_{LPFC}$ falls to zero sometime before the switch $Q_1$ is turned on, and the current of the diode $D_5$ also falls to zero naturally. Therefore, in DCM there is no reverse recovery loss associated with the diode $D_5$.

In CCM, during each switching cycle, the inductor current $i_{LPFC}$ as well as the current through the diode $D_5$ do not fall to zero before switch $Q_1$ is turned on. Therefore, in CCM, there is reverse recovery loss associated with the diode depending on the property of the diode. In DCM/CCM boundary/critical mode, the switch $Q_5$ is turned on right after the inductor and diode current falls to zero, resulting in no reverse recovery loss.

FIG. 6 shows the current waveform of a PFC inductor operating in DCM/CCM boundary mode. In particular, FIG. 6 illustrates the rectified input voltage $v_{REC}$, the inductor current $i_{LPFC}$ and the input line current $i_{in}$ for a PFC inductor operating in DCM/CCM boundary mode. It can be seen from FIG. 6 that the peak current of the PFC inductor is twice the absolute line current $i_{in}$. Although there is no reverse recovery loss associated with PFC diode $D_5$ in this case, significant power loss may result in the PFC inductor winding and switch $Q_1$ because of the severely pulsating current. Furthermore, the pulsating current needs a large EMI filter, increasing the size and cost of the power supply.

For CCM PFC control, the inductor current ramps up and down following the shape of the input voltage. FIG. 7 shows the current waveform of a PFC inductor operating in CCM. In particular, FIG. 7 illustrates the rectified input voltage $v_{REC}$, the inductor current $i_{LPFC}$ and the input line current $i_{in}$ for a PFC inductor operating in CCM. As shown in FIG. 7, the ripple of the PFC inductor current $i_{LPFC}$ is significantly lower, depending on the inductance of the PFC inductor and switching frequency. A lower ripple current of the PFC inductor leads to a smaller EMI filter and lower conduction power loss in the PFC inductor $L_{PFC}$ and switch $Q_1$.

FIG. 8 shows yet another power supply 40 including a boost PFC 42 and a DC/DC converter 44. The PFC stage 42 shapes the input current waveform so that it follows the input voltage waveform. The DC/DC stage 44 converts the PFC output voltage $V_B$ to a suitable voltage/current to drive the LED load 14. A dimming controller 46 controls the brightness of the LEDs with pulse-width-modulated dimming or analog/linear dimming.

SUMMARY

A power supply circuit according to some embodiments includes a boost inductor configured to receive a rectified input signal, a diode coupled to the boost inductor, a bulk capacitor coupled to the diode, wherein the diode is configured to couple energy from the boost inductor to the bulk capacitor, and a switch coupled to the boost inductor. The boost inductor has a parasitic capacitance less than about 100 pF. The diode may be a Schottky diode.

The power supply circuit may further include a controller coupled to the switch and configured to control a state of the switch. The controller may be configured to operate the power supply circuit in a continuous conduction mode.

The inductor may include a core, a wire coil wrapped around the core in a plurality of layers, and an insulation layer between first and second layers of the wire coil.

The insulation layer may include a layer of insulation tape, and in some embodiments, the insulation layer may include at least two layers of insulation tape. The insulation layer may have a thickness of at least about 1 mil, and may include a material having a relative permittivity of about 1 to about 5.

The layers of the coil may be wound in a "C" winding configuration or in a "Z" winding configuration.

The inductor may further include insulation layers between each pair of adjacent layers of the wire coil. In particular embodiments, the inductor may further include a plurality of layers of insulation tape between each pair of adjacent layers of the wire coil.

An inductor according to some embodiments includes a core, a wire coil wrapped around the core in a plurality of layers, and an insulation layer between first and second layers of the wire coil.

A power supply circuit according to further embodiments includes an input configured to receive an input voltage, an output configured to supply an output voltage, an inductor, and a switch. The boost inductor may have a parasitic capacitance less than about 100 pF.

The power supply circuit may include one of a boost converter, a buck converter, a split-pi converter, a Cuk converter, a SEPIC converter, and a buck-boost converter.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

From the discussion in the Background above, it is clear that CCM is an attractive choice for a power supply that powers LED loads. Compared to the conventional discontinuous-conduction mode (DCM) or CCM/DCM boundary mode PFC circuit, CCM requires a smaller EMI filter.

Figure 1:
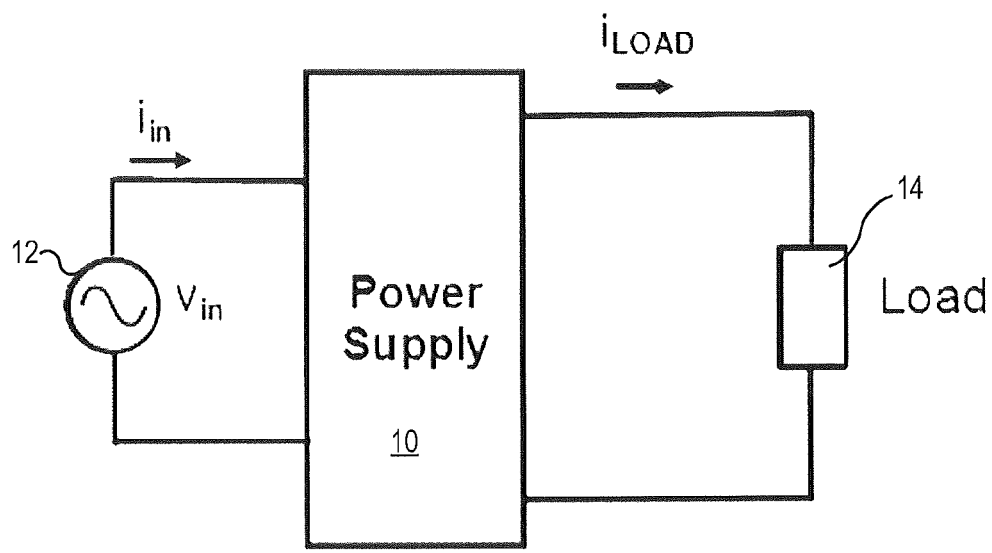
FIG. 1 is a block diagram of a power supply.
Figure 2:
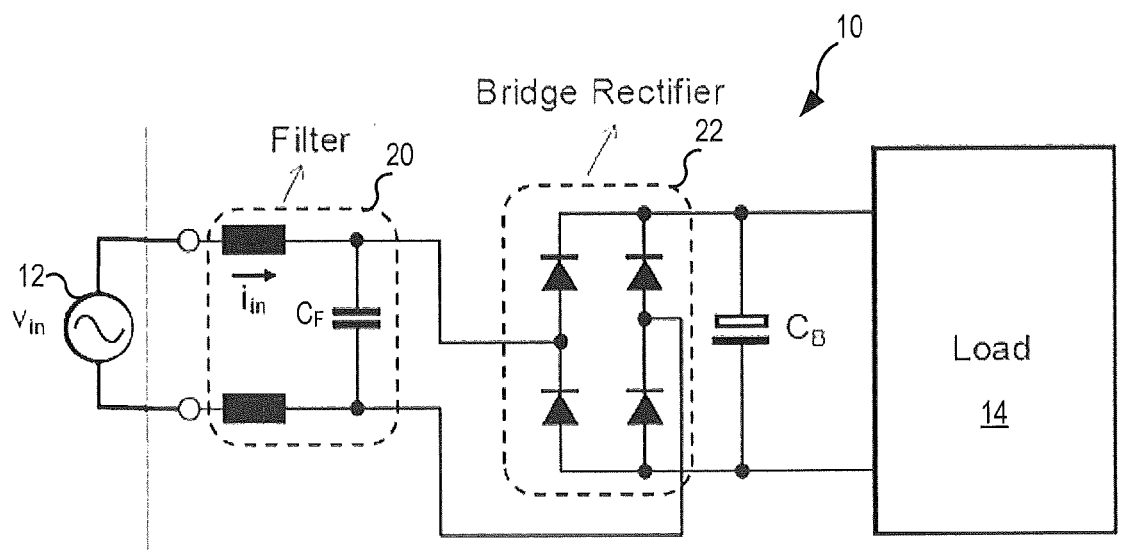
FIG. 2 is a circuit diagram of a simple conventional power supply.
Figure 3:
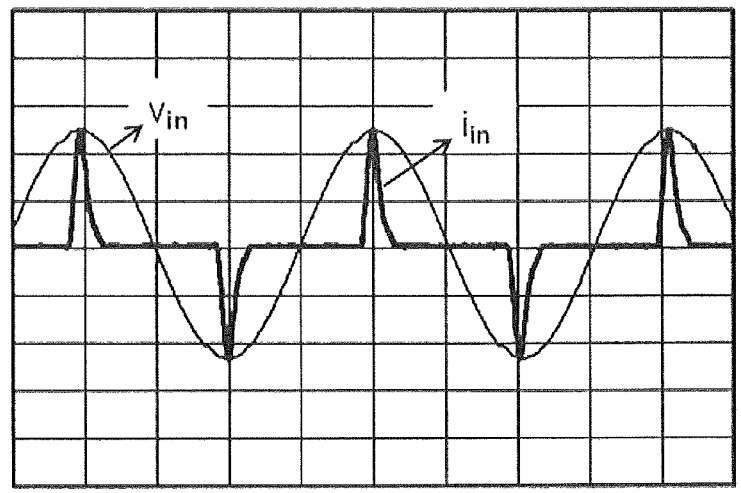
FIG. 3 is a graph of line voltage and current drawn by the power supply of FIG. 2.
Figure 4:
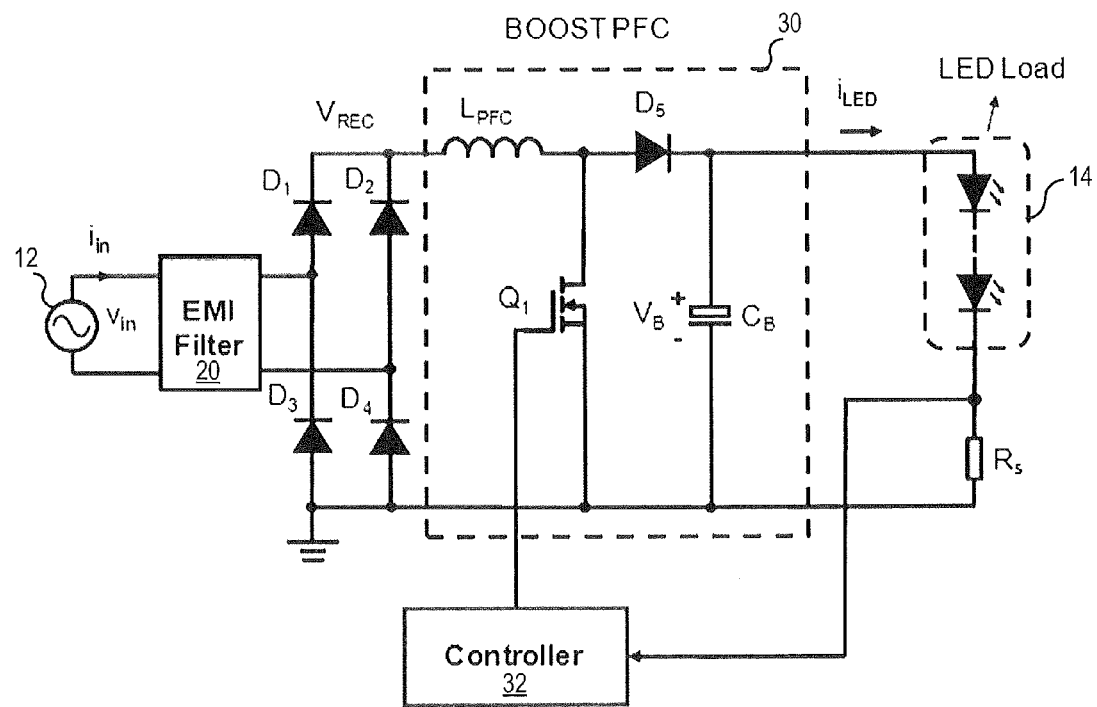
FIG. 4 is a circuit diagram of a conventional power factor correcting power supply.
Figure 5:
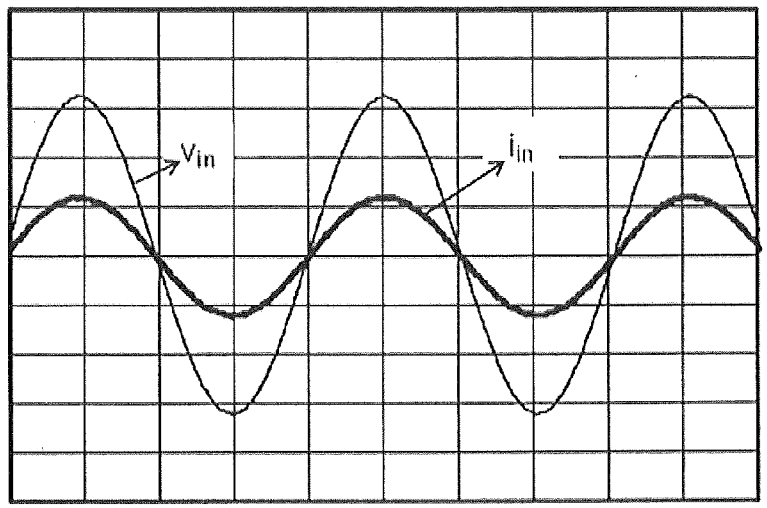
FIG. 5 is a graph of line voltage and current drawn by the power supply of FIG. 4.
Figure 6:
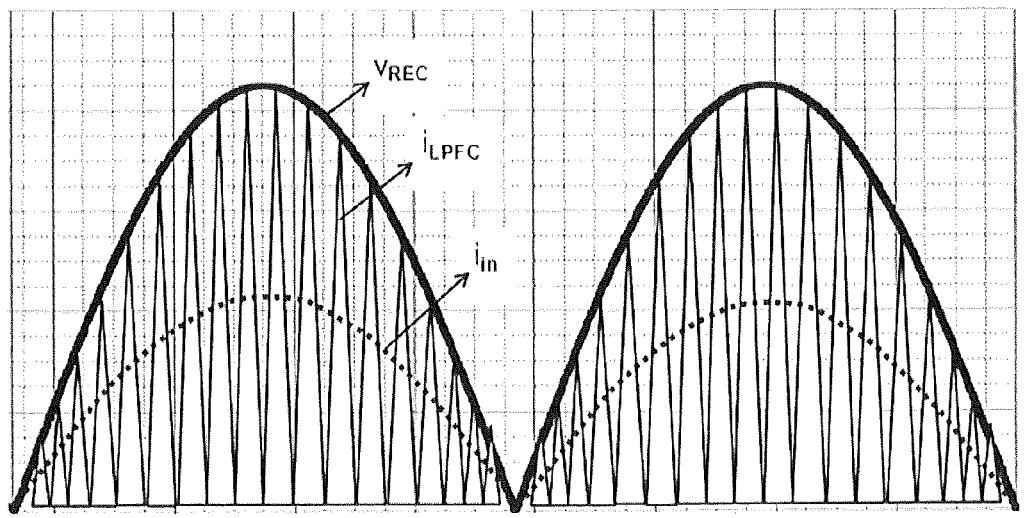
FIG. 6 is a graph of the rectified voltage, inductor current and input current in the power supply of FIG. 4 operating in DCM/CCM mode.
Figure 7:
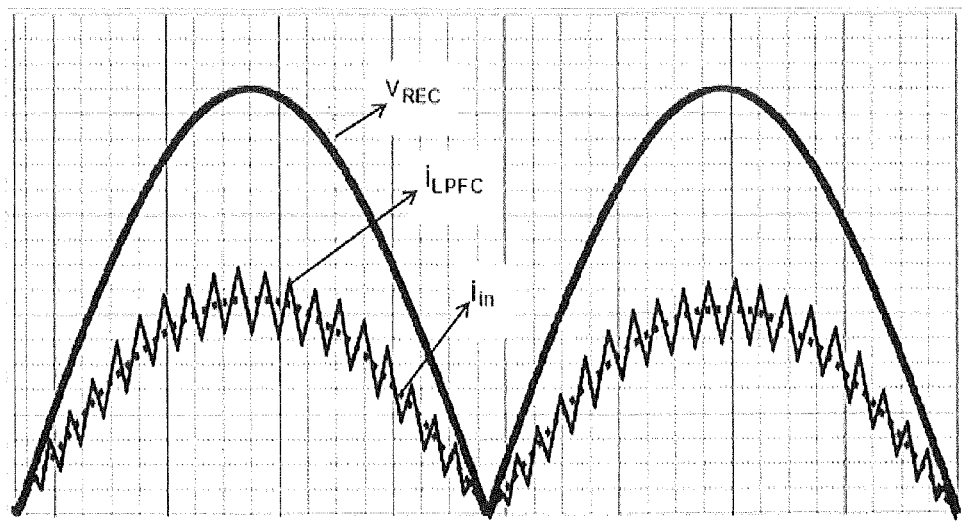
FIG. 7 is a graph of the rectified voltage, inductor current and input current in the power supply of FIG. 4 operating in CCM mode.
Figure 8:
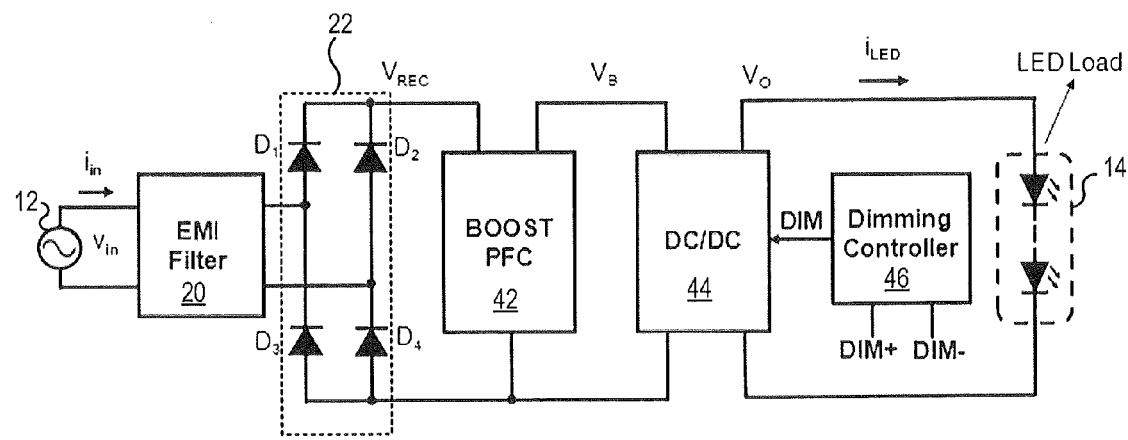
FIG. 8 is a block diagram of an LED driver circuit including an active boost power factor correcting power supply with a DC/DC converter.
Figure 9:
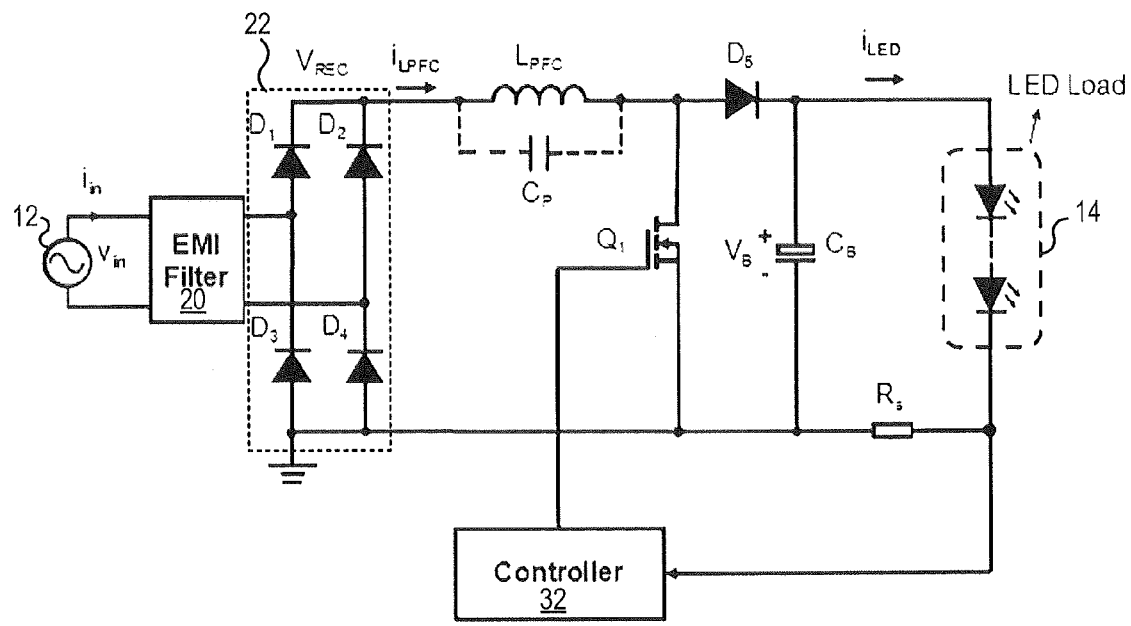
FIG. 9 is a block diagram of a power factor correcting power supply showing the parasitic capacitance of the PFC inductor.
Figure 10:
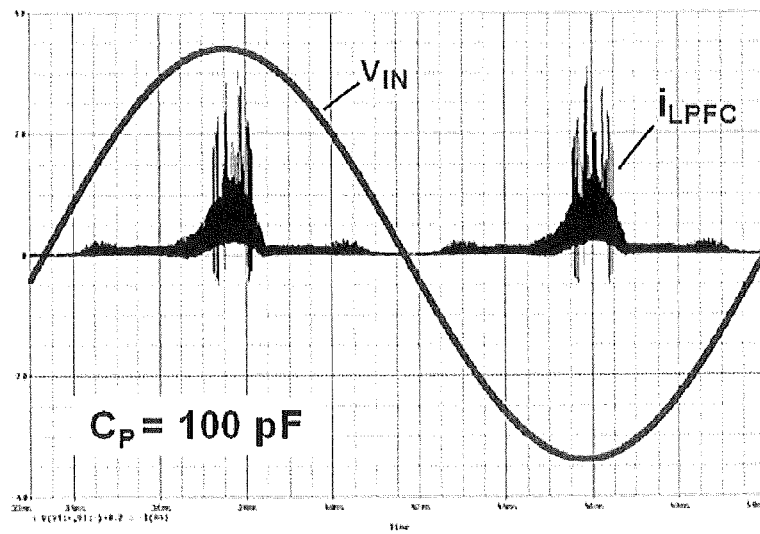
FIGS. 10 and 11 are graphs of simulated inductor current and input voltage waveforms of a power factor correcting power supply that includes parasitic capacitance in the PFC inductor.
Figure 11:
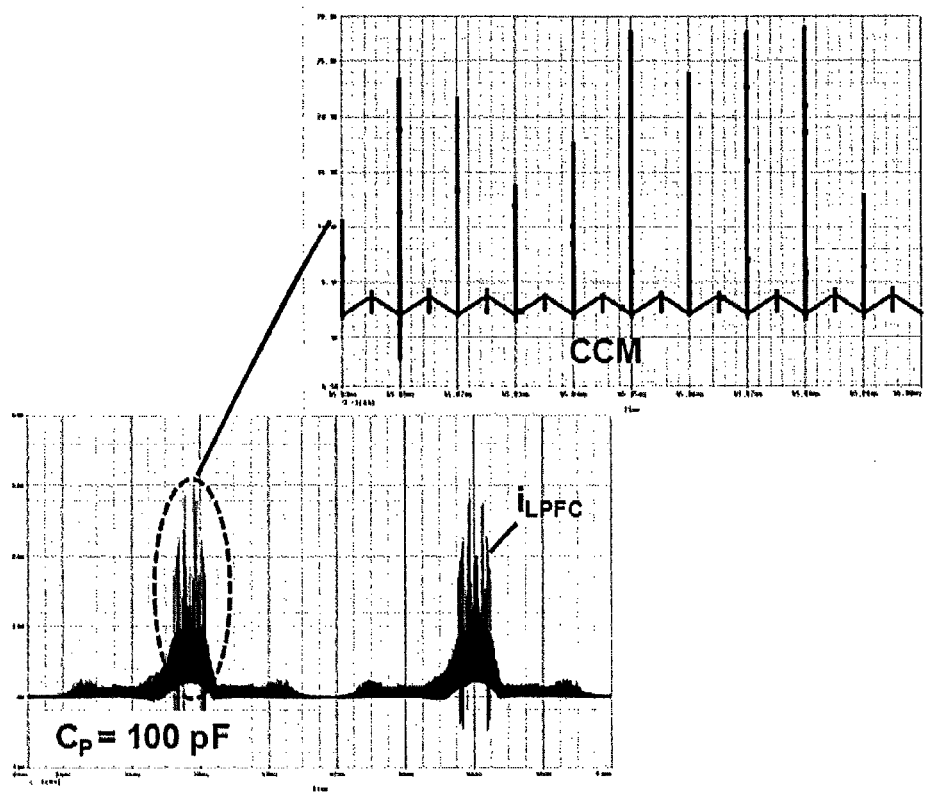
Figure 12:
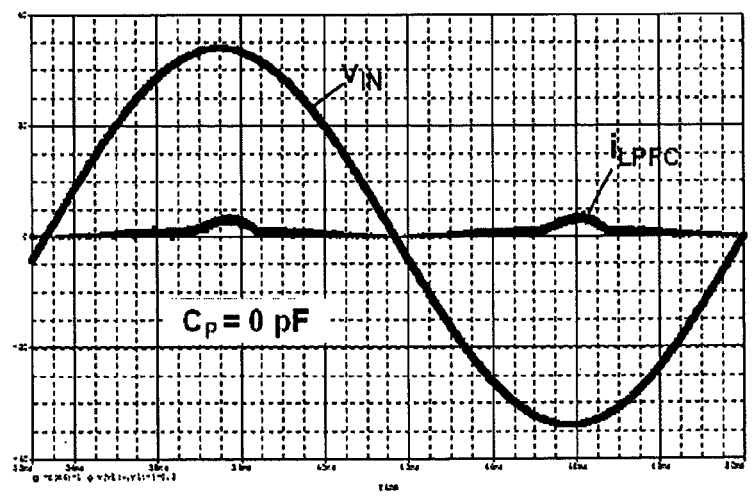
FIG. 12 is a graph of simulated inductor current and input voltage waveforms of a power factor correcting power supply assuming zero parasitic capacitance in the PFC inductor.

The power loss resulting from the reverse recovery of the PFC diode in CCM can be essentially eliminated by using SiC (Silicon Carbide) Schottky diode, such as a diode CSD01060E (600V, 1A) from Cree, Inc., as the boost diode $D_5$. However, one issue that is commonly neglected is the parasitic capacitance, $C_P$ of the PFC inductor, as shown in FIG. 9. FIGS. 10-11 show the simulated current waveforms of the CCM PFC inductor with a lumped parasitic capacitance of 100 pF across it. The simulation conditions are: $V_{IN}$=120 VRMS (60 Hz), switching frequency f=100 kHz, duty cycle D=50%, $L_{PFC}$=500 µH, $C_B$=68 µF, and $R_{LOAD}$=1 kΩ. As can be seen from those two figures, the current that flows through the PFC inductor and switch sees a spike at the moment when the switch $Q_1$ is turned on during each switching cycle. These current spikes are caused by the discharge of the parasitic capacitor $C_P$, and are dependent on the voltage across the capacitor, which is ($V_B$−$v_{REC}$). Each time the switch $Q_1$ is turned on, the capacitor $C_P$ is discharged first, and then charged to voltage $v_{REC}$. For an ideal inductor having a parasitic capacitance $C_P$=0 pF, its simulated current waveform is clean, as shown in FIG. 12.

Figure 13:
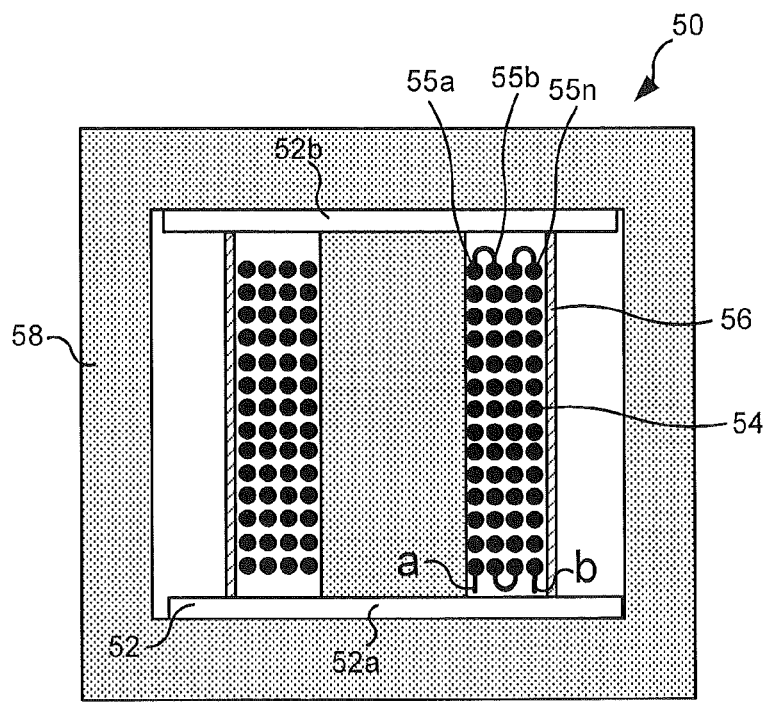
FIG. 13 is a cross-sectional illustration of a conventional PFC inductor having a "C" winding configuration.

In practical applications, however, there are no PFC inductors with zero parasitic capacitance. An inductor is normally composed of a magnetic core and a winding wound on a bobbin (or coil former). FIG. 13 shows a cross-sectional view of a typical "C" wound inductor winding 50. The inductor includes a coil former 52 including a core 58. A conductive wire 54, which may be a copper wire, is wound around a central portion of the core 58. The winding is covered with an insulation layer, such as an insulation tape 56. The core 58 stores magnetic energy generated by current passing through the winding. The core 58 may extend around the coil on one or both sides of the coil former 52 to provide a closed path for the magnetic field generated by the coil. The core 58 may include a ferromagnetic or ferrimagnetic material. The core may in some embodiments include an air gap; however, using a material that has a higher permeability than air generally increases the inductance of the inductor.

In the structure shown in FIG. 13, the winding starts from point "a" adjacent the central portion of the core 58, fills a first layer 55a, then continues to fill the second layer 55b. This process is repeated until the last layer, and ends at point "b". In a "C" wound inductor, the wire is wrapped around the coil former in a first direction from a first end 52a of the coil former to the second end 52b to form the first layer 55a. The wire is then wrapped from the second end 52b to the first end 52a to form the second layer 55a. This back and forth winding is repeated until the total desired number of layers has been formed. The maximum voltage between two neighboring winding layers is $2V_{REC}/n_L$, where $n_L$ is the total number of winding layers.

Figure 14:
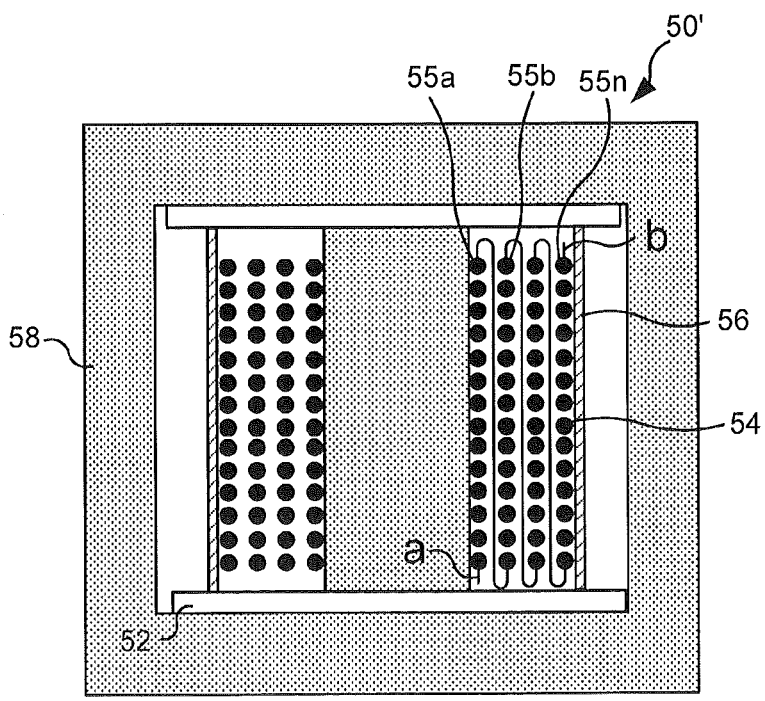
FIG. 14 is a cross-sectional illustration of a conventional PFC inductor having a "Z" winding configuration.

A "Z" wound inductor winding is shown in FIG. 14. In this winding scheme, the winding starts from point "a" at the first end 52a of the coil former 52, and is wrapped to the second end 52b of the coil former 52 to form the first layer 55a. The wire 54 is then brought back to the first end 52a of the coil former, and is wrapped again from the first end 52a to the second end 52b of the coil former 52 to form the second layer 55b. This pattern is repeated until the last layer 55n is formed, and ends at point "b".

The maximum voltage between two neighboring winding layers in the "Z" wound structure is reduced to $V_{REC}/n_L$. Since the energy stored in a capacitor is proportional to the squared value of the voltage across the capacitor, the "Z" wound structure may reduce the stored energy of the parasitic capacitance by a factor of 1/4, which may decrease the current spikes and associated EMI noise at the turn-on of the PFC switch $Q_1$. However, the zigzag winding method may cause manufacturing difficulties and/or cost increases, and may also increase the effective wire length and copper loss.

Some embodiments provide a power supply, e.g., a power supply to power light-emitting diodes (LEDs), having low electro-magnetic interference (EMI). The power supply can be used as a power source for any load. By utilizing an inductor with low parasitic capacitance and a diode with reduced recovery loss in a continuous conduction-mode (CCM) power-factor-correction (PFC) circuit, a power supply according to some embodiments may have low electro-magnetic interference caused by the PFC inductor and diode. The low parasitic capacitance may be achieved, for example, by adding additional layers of insulation tape to the winding.

A low parasitic capacitance inductor according to some embodiments can be utilized in virtually any power supply that includes an inductor, such as an LED driver that uses an inductor for power factor correction or other purposes.

Conventionally, the insulation tape is used to cover the outermost inductor winding and provide insulation from the magnetic core and electrically conducting parts close to it, as shown in FIG. 13. In order to reduce the current spikes caused by the parasitic capacitance of the PFC inductor when the PFC switch is turned on, some embodiments add one or more layers of insulation tape between neighboring winding layers in the inductor.

Figure 15:
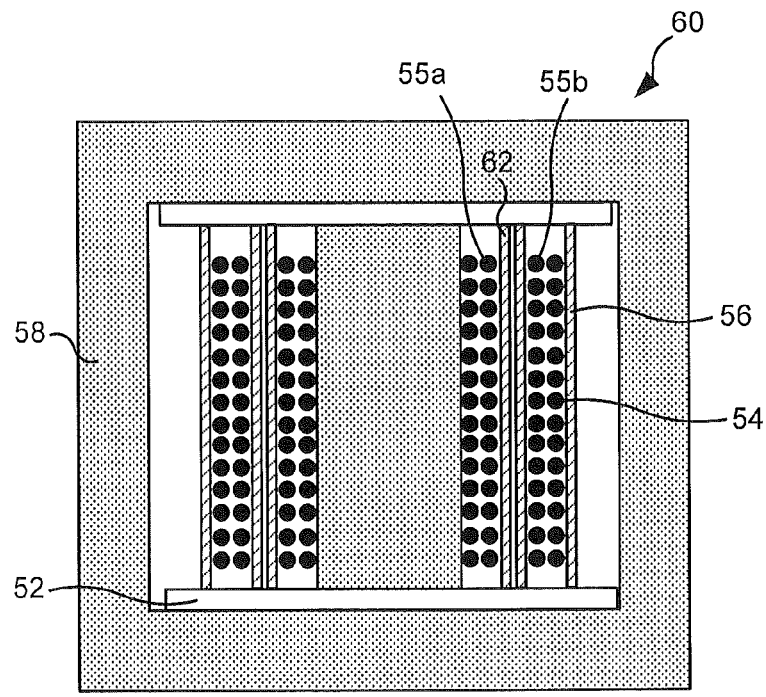
FIG. 15 is a cross-sectional illustration of a PFC inductor according to some embodiments.

FIG. 15 shows an example of an inductor structure 60 according to some embodiments. In addition to the outermost insulation layer 56, one or more insulation layers 62 are provided between two adjacent winding layers. These additional insulation layers 62, which may be formed using insulation tape similar to the insulation tape 56, provide a larger spacing between the windings, which may reduce the parasitic capacitance of the inductor, since the capacitance between two conducting parts is inversely proportional to the spacing between them.

Figure 16:
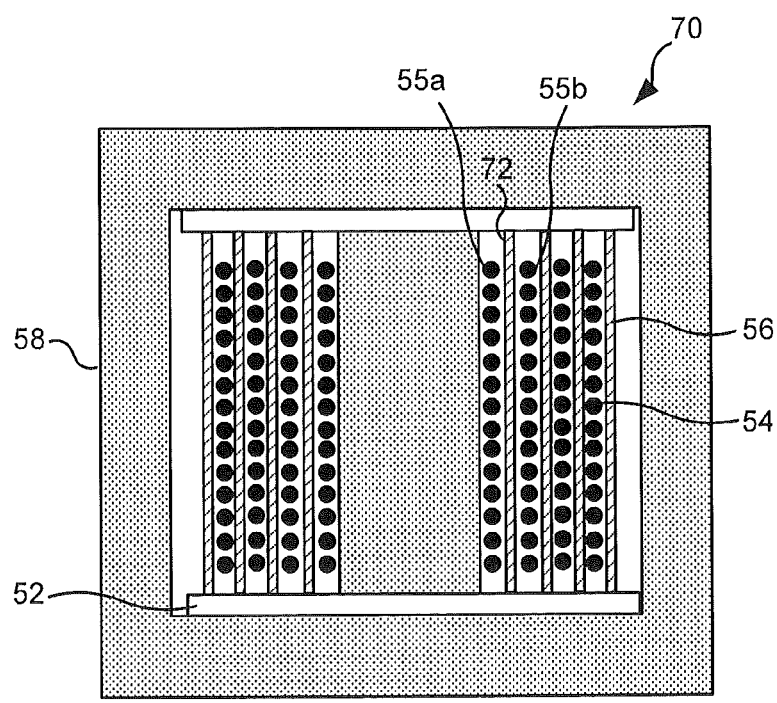
FIGS. 16 and 17 are cross-sectional illustrations of PFC inductors according to further embodiments.
Figure 17:
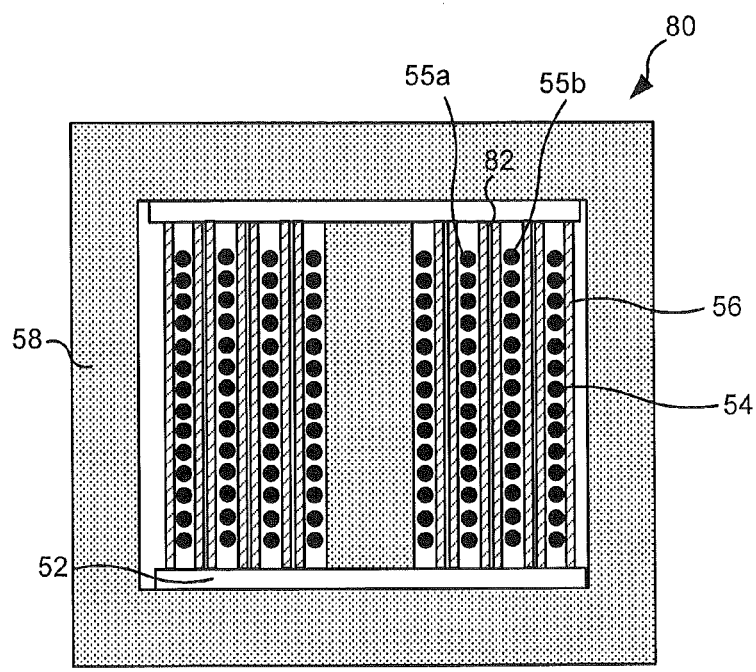

FIG. 16 illustrates an inductor structure 70 according to further embodiments. The inductor structure 70 includes one or more layers of insulation tape 72 between every two neighboring winding layers. To reduce the parasitic capacitance further, two or more insulation layers 82 may be provided between every two neighboring winding layers 55a, 55b, as shown in the inductor structure 80 of FIG. 17, depending on the area available. In some embodiments, three or more layers of insulation tape may be provided between neighboring winding layers in the inductor.

The insulation tape may have a thickness of a few mils (1 mil=0.001 inch). Thus, each layer of insulation tape may provide an additional spacing of a few mils between neighboring layers of the inductor winding.

The insulation layers may be provided with insulation tape or with any other suitable insulator that can be placed between adjacent windings of an inductor. Insulation tape has a relative permittivity of about 1 to about 5. In general, the insulation layers provided between adjacent winding layers may have a relative permittivity of between about 1 and 5. To reduce the parasitic capacitance between adjacent layers, it may be desirable for the insulation material to have a permittivity less than 3.

To further reduce the parasitic capacitance, further embodiments may utilize a "Z" winding configuration together with a plural number of layers of insulation tape 72 between two neighboring winding layers.

An inductor according to some embodiments may have a parasitic capacitance less than about 100 pF. In some embodiments, the inductor may have a parasitic capacitance less than about 50 pF.

Figure 18:
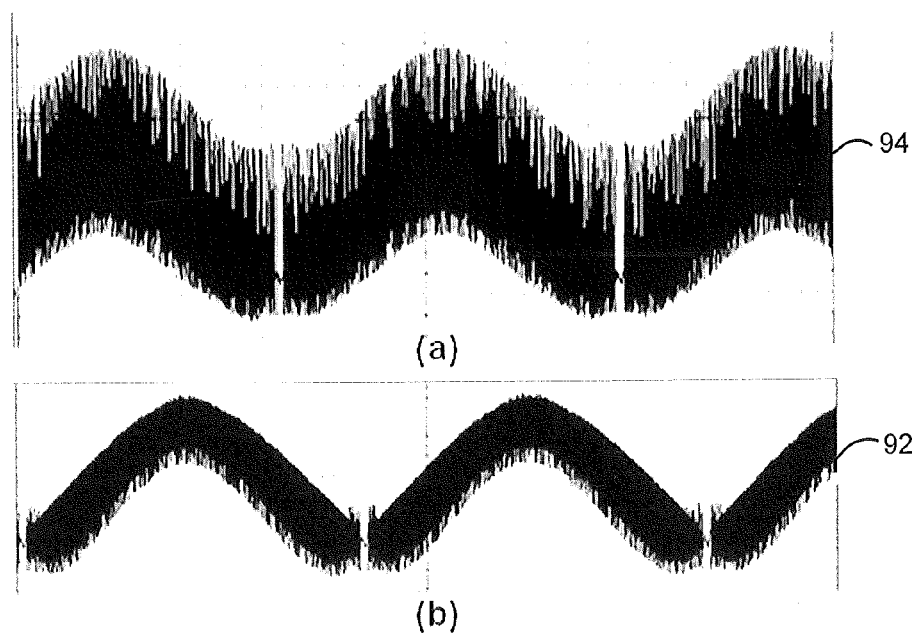
FIG. 18 is a graph illustrating measured current waveforms of a PFC inductor in a power factor correcting power supply with and without a low parasitic capacitance according to some embodiments.

FIG. 18 is a graph showing a comparison of the measured current waveforms of the PFC inductor with (graph 92) and without (graph 94) a low parasitic capacitance in a 45 W boost PFC power supply according to some embodiments. The test conditions that generated the graph of FIG. 18 are as follows:

$L_{PFC}$=2 mH

Magnetic core: PQ2020

Winding: 3 layers, 31 turns of AWG #28 wire for each winding layer, 93 turns in total with C winding.

3 layers of insulation tapes between each two neighboring wire layers, 6 layers of insulation tapes in total PFC switch $Q_1$: STD7NK4OZ PFC diode $D_5$: Cree SiC Schottky diode: CSD01060E, 1A, 600V.

As can be seen from FIG. 18(*b*) compared to FIG. 18(*a*), there is a dramatic reduction in current spikes or noise after adding 3 layers of insulation layers between two neighboring winding layers. In contrast, with the current spikes shown in curve 94, the power supply may not obtain a desired level of EMI performance.

Figure 19A:
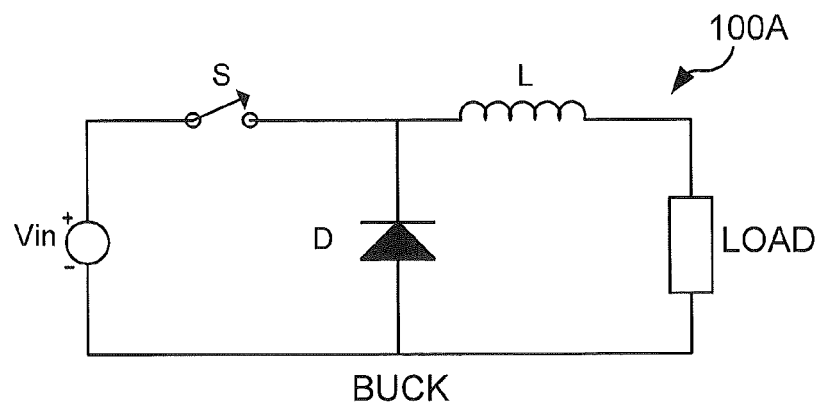
FIGS. 19A to 19E illustrated various converter topologies in which inductors according to some embodiments can be employed.

FIGS. 19A to 19E illustrated various converter topologies in which inductors according to some embodiments can be employed. In particular, FIG. 19A illustrates a buck converter circuit 100A in which an inductor according to some embodiments can be employed. The buck converter circuit 100A includes a switch S, a diode D and an inductor L. The inductor L may be formed as described above to have a parasitic capacitance less than about 100 pF.

Figure 19B:
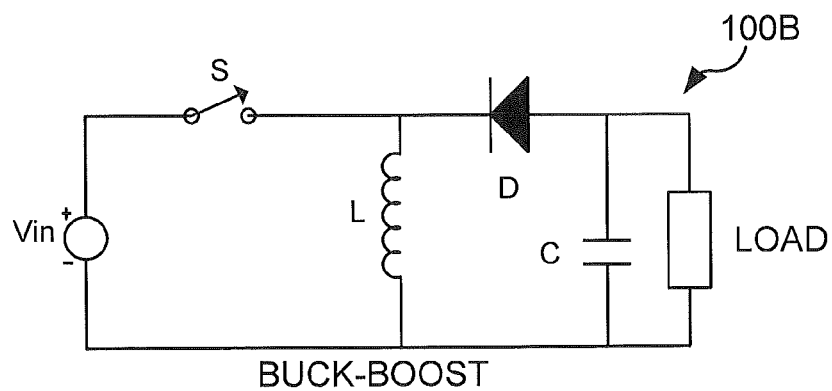

FIG. 19B illustrates a buck-boost converter circuit 100B in which an inductor according to some embodiments can be employed. The buck-boost converter circuit 100B includes a switch S, a diode D, a capacitor C, and an inductor L. The inductor L may be formed as described above to have a parasitic capacitance less than about 100 pF.

Figure 19C:
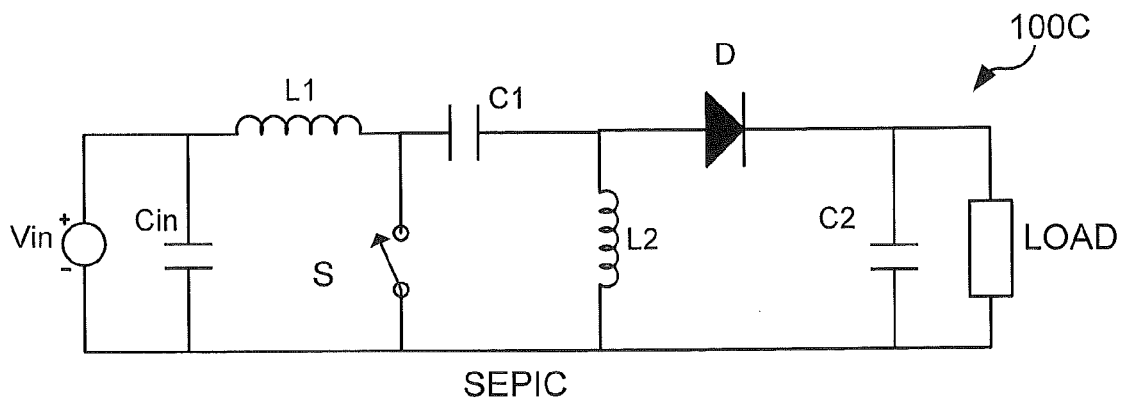

FIG. 19C illustrates a SEPIC (single-ended primary-inductor converter) circuit 100C in which an inductor according to some embodiments can be employed. The SEPIC converter circuit 100O includes a switch S, a diode D, first and second capacitors C1, C2, and first and second inductors L1 and L2. One or both of the inductors L1 and L2 may be formed as described above to have a parasitic capacitance less than about 100 pF.

Figure 19D:
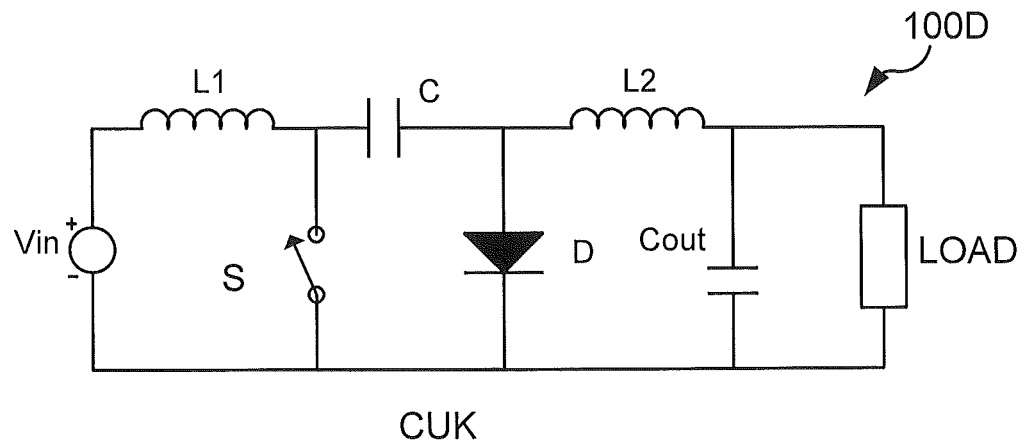

FIG. 19D illustrates a Cuk converter circuit 100D in which an inductor according to some embodiments can be employed. The Cuk converter circuit 100D includes a switch S, a diode D, first and second capacitors C, Gout, and first and second inductors L1 and L2. One or both of the inductors L1 and L2 may be formed as described above to have a parasitic capacitance less than about 100 pF.

Figure 19E:
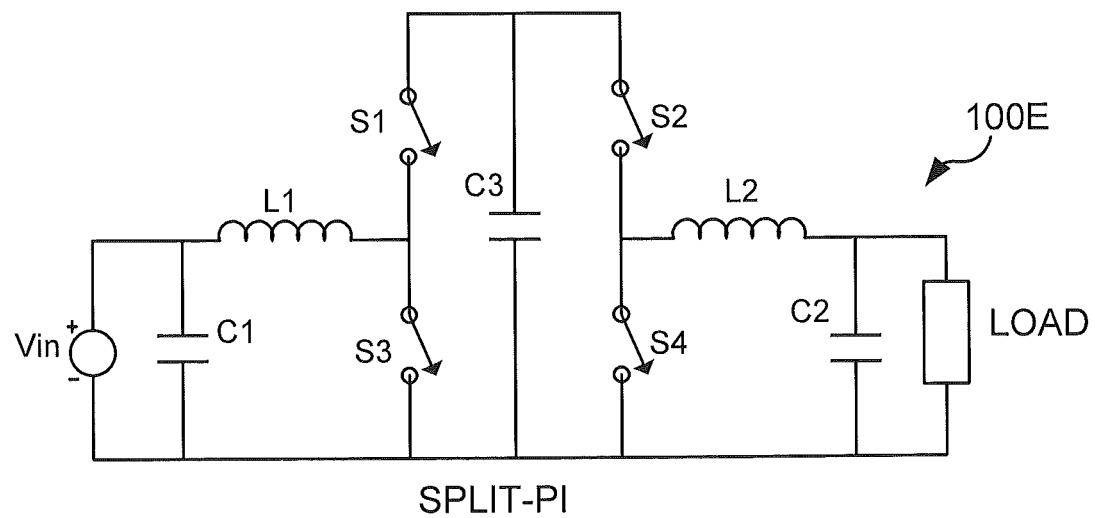

FIG. 19E illustrates a split-pi circuit 100E in which an inductor according to some embodiments can be employed. The split-pi converter circuit 100E includes switches S1 to S4, first and second capacitors C1, C2, and first and second inductors L1 and L2. One or both of the inductors L1 and L2 may be formed as described above to have a parasitic capacitance less than about 100 pF.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A power supply circuit comprising:
   a boost inductor configured to receive a rectified input signal;
   a diode coupled to the boost inductor;
   a bulk capacitor coupled to the diode, wherein the diode is configured to couple energy from the boost inductor to the bulk capacitor; and
   a switch coupled to the boost inductor;
   wherein the boost inductor has a parasitic capacitance less than about 100 pF; and
   wherein the boost inductor comprises a core having a first end and a second end, a wire coil wrapped around the core in a plurality of layers, and an insulation layer between first and second layers of the wire coil, and
   wherein the insulation layer comprises at least one layer of an insulating material having a relative permittivity greater than one that extends around the first layer of the wire coil and extends from a first end of the core to a second end of the core.

2. The power supply circuit of claim 1, wherein the diode comprises a Schottky diode.

3. The power supply circuit of claim 1 further comprising a controller coupled to the switch and configured to control a state of the switch, wherein the controller is configured to operate the power supply circuit in a continuous conduction mode.

4. The power supply circuit of claim 1, wherein the insulating material comprises a layer of insulation tape.

5. The power supply circuit of claim 4, wherein the insulation layer comprises at least two layers of insulation tape.

6. The power supply circuit of claim 1, wherein the insulation layer has a thickness of at least about 1 mil.

7. The power supply circuit of claim 1, wherein the insulation layer comprises a material having a relative permittivity of about 1 to about 5.

8. The power supply circuit of claim 1, wherein the layers of the coil are wound in a "C" winding configuration.

9. The power supply circuit of claim 1, wherein the layers of the coil are wound in a "Z" winding configuration.

10. The power supply circuit of claim 1, wherein the inductor further comprises insulation layers between each pair of adjacent layers of the wire coil.

11. The power supply circuit of claim 1, wherein the inductor further comprises a plurality of layers of insulation tape between each pair of adjacent layers of the wire coil.

12. The power supply circuit of claim 1, wherein the insulation layer comprises a material having a relative permittivity of less than 3.

13. The power supply, circuit of claim 1, wherein the wire coil comprises at least three layers, and wherein the inductor further comprises insulation layers between each pair of adjacent layers of the wire coil.

14. A power supply circuit comprising:
an input configured to receive an input voltage;
an output configured to supply an output voltage;
at least one inductor;
at least one diode; and
at least one switch;
wherein the at least one inductor has a parasitic capacitance less than about 100 pF; and
wherein the boost inductor comprises a core, a wire wrapped around the core in a plurality of layers, and an insulation layer between first and second layers of the wire coil, and
wherein the insulation layer comprises at least one layer of an insulating material having relative permittivity greater than one that extends around the first layer of the wire coil.

15. The power supply circuit of claim 14, wherein the power supply circuit comprises one of a boost converter, a buck converter, a split-pi converter, a Cuk converter, a single-ended primary-inductor converter, and a buck-boost converter.

\* \* \* \* \*